Sept. 8, 1970 D. P. JENSON ETAL 3,527,118
SELECTIVE AUTOMATIC AND MANUAL THROTTLE ACTUATOR
Filed July 10, 1968

INVENTORS
DONALD P. JENSON
JAMES H. MURRILL

BY

*H. H. Loseke*
ATTORNEY

United States Patent Office 3,527,118
Patented Sept. 8, 1970

3,527,118
SELECTIVE AUTOMATIC AND MANUAL THROTTLE ACTUATOR
Donald P. Jenson, Lakewood, and James H. Murrill, Santa Ana, Calif., assignors, by mesne assignments, to the United States of America as represented by the Secretary of the Navy
Filed July 10, 1968, Ser. No. 743,733
Int. Cl. F16h 1/32
U.S. Cl. 74—626          3 Claims

ABSTRACT OF THE DISCLOSURE

An automatic power compensation throttle actuator and manual throttle override on the throttle shaft for power plants having a throttle motor driving through a differential to the throttle shaft, the differential having a brake engageable for throttle motor actuation of the throttle and disengageable by the manual override to avoid heavy drag during manual throttle operation to allow selective automatic power compensation and manual throttle control.

BACKGROUND OF THE INVENTION

Figure 1:
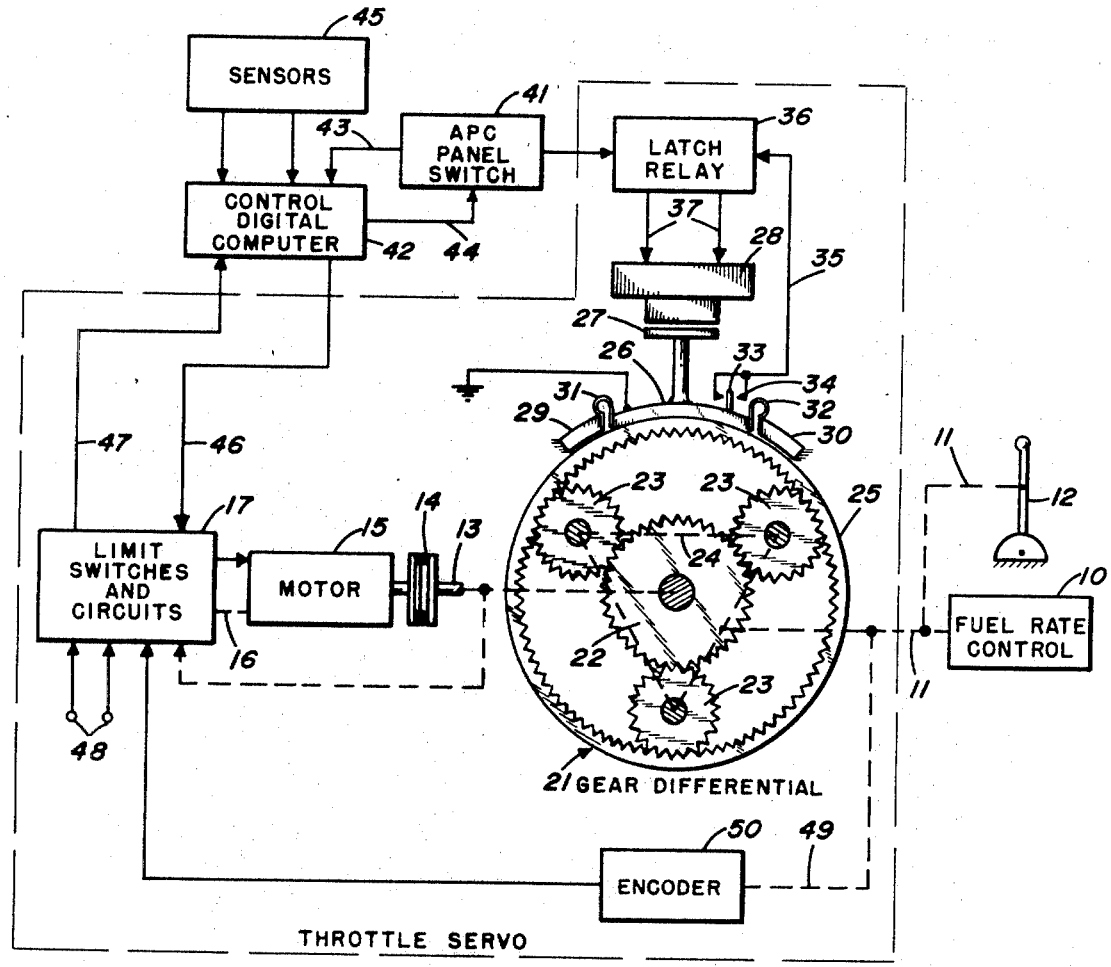

The invention relates to throttle control of engine power plants and more particularly to programmed automatic power compensation throttle actuation for engines of large aircraft with manual throttle override.

As aircraft with internal combustion, gas turbine, or jet engines become larger, the means of controlling the fuel flow or fuel rate for power control automatically with manual override becomes increasingly greater. The manual actuation of the throttle for light aircraft is the best means of controlling the craft after mental evaluation of the flight factors involved whereas with large aircraft these flight factors must be considered by automatic control means for throttle control, such as propeller pitch if an internal combustion engine with variable pitch propeller is used, motor revolutions per minute (r.p.m.), speed of the aircraft, air density, temperature, acceleration or deceleration, climb or glide, etc. All of these factors may be applied to a computer to produce an optimum throttle setting by prearranging limit switches in the circuit of the throttle motor actuator. Such motorized throttle devices may be understood from the patents of Hoffman et al., 2,974,479; Kinney, 3,023,801; Joline, 3,146,830; and Blackaby, 3,295,317. The disadvantage in most of these throttle control devices is the high overriding pressure that is required by hand to override the torque on the throttle shaft produced by the automatic throttle control.

SUMMARY OF THE INVENTION

In the present invention a throttle motor, preferably electric, has its shaft coupled to one input of a differential gear, for example, the sun gear, and the output shaft to the throttle coupled to the planetary gear spider cage of the differential with the ring gear of the differential gear held by a brake. The input and output shafts of the differential gear set operate as a straight-through shaft. The brake has an electromagnetically operated brake shoe that normally rests against the outer drum surface of the ring gear. The shoe is spring biased in a central position and is operable to make a circuit through a microswitch in either direction against the spring bias. The microswitch contacts energize a latch relay in circuit with the electromagnet of the brake to withdraw the brake shoe from the ring gear drum surface thereby relieving the electric throttle motor load from the input shaft. This override of the brake is accomplished by mechanical linkage of the manual throttle to the output throttle shaft. A panel switch on the automatic power compensation panel of the computer or programmer may be energized to deactivate the latch relay to replace the electric throttle motor in control of the throttle setting.

As an alternative, the manual throttle may include a pickle switch to trip the latch relay whenever it is desirable to override the automatic throttle control. Since the manual throttle control is directly connected to the throtle, the disengagement of the brake allows the ring gear to rotate freely about the sun gears as the throttle shaft rotates the planetary gears. Accordingly, automatic and manual throttle control is selective and the manual control does not require high torque operation.

DESCRIPTION OF THE PREFERRED EMBODIMENTS

Referring more particularly to FIG. 1, there is shown, partly in block and partly in mechanical schematic, a throttle servo and manual throttle control means for actuating a throttle shaft to control the fuel rate in a device such as to a carburetor, fuel injection rate valve, or other valve means herein illustrated in block 10 and identified as the fuel rate control. The fuel rate control is actuated through a mechanical throttle rod means shown by dotted line 11 herein from a throttle control lever 12 affixed in the airframe of the aircraft, or on the ship's structure where used for a ship fuel rate control. While it is to be understood that this throttle actuator means may be used in other than aircraft, such as in a ship, in a tank, or a stationary power plant, or in other means, it will be described herein with relation to an aircraft for simplicity and in giving one mode of operation and use. The throttle shaft 11 is shown herein coupled to a differential gear mechanism as the output shaft thereof, an input shaft 13 to the differential gear mechanism being through a slip friction clutch 14 from a throttle motor 15, preferably an electric motor. The electric motor 15 is double ended having a shaft 16 entering a circuit component, such as shown in block 17, constituting the limit switches in circuit for the electric motor hereinafter more fully described.

The differential gear system, herein designated by the principal reference character 21, is of the usual construction and consists of a sun gear 22, planetary gears 23 on a planetary gear spider cage or support 24, and a ring gear 25, the outer surface of which provides a brake drum surface. In this illustration the throttle shaft 13 is shown as being connected to the sun gear 22 while the throttle shaft 11 is connected to the planetary gear cage or spider 24. It may be readily understood at this point in the descriptive specification that when ever the ring gear 25 is locked against rotation, shaft rotation of either throttle shaft 11 or 13 will cause rotation of the other shaft in the same rotative direction and, if the planetary gears 23 and sun gear 22 are of the proper number of teeth, the input and output throttle shafts 11 and 13 can be made to rotate in equal angular increments. To maintain the ring gear 25 in a stationary position an electromagnetic brake, consisting of a brake shoe 26 on an armature 27 in close air space relation to the armature of an electromagnet coil 28, normally holds the ring gear 25 in a frictionally brake condition. The brake shoe 26 is supported between two limit blocks 29 and 30 affixed to the airframe, each with a U-shaped spring 31 and 32 positioned between the ends of the blocks 29 and 30 and the ends of the brake shoe 26 to support the brake shoe 26 in a substantially central position between the blocks. The brake shoe 26 has a upstanding lug 33 which provides an electrical ground contact for a pair of switch contacts 34 in close proxmity to this grounding lug. The switch 33, 34 is really a two-way microswitch which is in circuit by way of conductor means 35 to a latch relay 36. The latch relay 36 controls a heavy duty circuit by way of the conductors 37 to the electromagnet actuator 28. Normally the brake shoe 26 rests frictionally against the drum surface of the ring gear 25 in the differential gear system 21. Any motor operation by the motor 15 to actuate the fuel rate control will produce a straight-through shaft operation of throttle shafts 11 and 13 in accordance with the motor 15 rotation. Since the fuel rate control 10 is of low mechanical resistance, the brake shoe 26 maintains the ring gear 25 against rotation in either direction merely by the tension of the springs 31 and 32. Whenever it is desirable to control the throttle manually by the manual throttle control lever 12, the automatic motor control circuit can readily be overcome by a force of the lever 12 to cause the ring gear 25 to rotate in one or the other direction against the springs 31 or 32 sufficiently to actuate the microswitch 33, 34 to energizing the latching function of the latch relay 36 thereby latching the main relay closed to energize the electromagnet 28 through the conductor means 37. Since the motor 15 resistance is quite large, the sun gear will resist rotation by the manual lever 12 a sufficient amount to force the ring gear 25 in either of its rotative directions to actuate microswitch 33, 34. Once the latch relay 36 is energized brake shoe 26 is retracted from its position of friction against the drum surface of ring gear 25 and held against the armature of the electromagnet 28 thereby allowing ring gear 25 to rotate freely upon the rotation of the planetary gears 23 whenever the manual lever 12 is opearted.

The latch relay 36 may be energized by an automatic power compensation panel switch shown in block 41 to release the latch relay to break the main circuit through the conductors 37 thereby again releasing the brake shoe 26 to frictionally engage the ring gear 25. The automatic power compensation panel switch 41 may receive its power from a central digital computer, shown in block 42 herein with conductors 43 and 44 to and from the central digital computer 42 and panel switch 41 providing the power and the feedback to the computer to place the computer in operation whenever the automatic power compensating panel switch is thrown to produce automatic throttle actuation. As may be well understood by those skilled in the art, as illustrated in the patents cited supra, the central digital computer 42 receives information from a number of sensory elements, herein shown in a single block 45, such as air temperature, air density, air pressure, propeller pitch (if a piston type engine is used), manifold pressure, rate of climb, or rate of descent, motor r.p.m., etc., for computing the optimum throttle setting for the engine to produce the most economical and power required operation for the aircraft. The central digital computer 42 is coupled by way of the conductor means 46 to set limit switches in 17 for the motor 15 control circuit and information of the setting of the limit switch is fed back by way of conductor means 47 for computer consideration. Motor 15 is provided power from any desirable source, which may be the battery power in the aircraft supplied to terminals 48. The motor output throttle shaft 11 is also coupled by way of a throttle shaft means 49 to an encoder 50, the output of which is coupled also to the limit switch circuits 17 to provide information to the limit switch circuit of the throttle shaft position 11, as well understood by those skilled in the art. By this feedback through the encoder means 50 the fuel rate control 10 should not be over-driven past its limits. Since the computer 42 and sensors 45 form no part of this invention and establish the environment for the invention, these components will not be described further. The limit switch means 17, motor 15, differential gear means 21, electromagnet clutch 28 including the relay 36, and the encoder means 50 all constitute a throttle servo mechanism providing automatic throttle control to the aircraft thrust power sources with provision for manual override.

Figure 2:
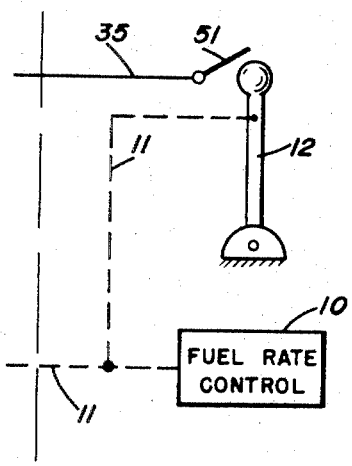

Referring more particularly to FIG. 2, the fuel rate control 10 is controlled by the throttle shaft 11 and the throttle control lever 12, as shown in FIG. 1. In this figure a pickle switch 51 may be used on the throttle control lever 11 thus eliminating the two-way microswitch 33, 34 on the brake drum 26 in FIG. 1. Pickle switch 51 may be connected directly by the conductor means 35 to the latch relay 26 such that at any time it is desirable to assume manual throttle control the pickle switch may be depressed to actuate the latch relay 36 to energize the electromagnet brake 26, 27, 28 and thus free the ring gear 25 for manual operation.

OPERATION

In the operation of this throttle control let it be assumed that the throttle servo mechanism is used in a large aircraft in flight and the throttle motor 15 is controlling the fuel rate control mechanism 10 by the positioning of its limit switches 17 in accordance with the aircraft flying conditions. If now, for example, the pilot desires to assume manual control for a particular reason of taking evasive action from a cloud formation, or another aircraft, or whatever the occasion requires, he may operate the throttle lever 12 in the direction for increasing or decreasing the fuel rate to the power plant of the aircraft. In FIG. 1 sufficient pressure on the throttle lever 12 to force the ring gear 25 in either of its angular directions to cause switch contacts 33 and 34 to make and energize the latch relay 36 will cause energization of the electromagnet in brake 26, 27, 28 to release the ring gear 25 and allow it to free wheel on the planetary gears 23 revolving about the sun gear 22. Even though the limit switches are set to cause motor 15 to be operating by rotating shaft 13 and sun gear 22, this will not affect the operation of the throttle shaft 11 produced by the manual throttle lever 12 since the planetary gears 23 will rotate on the sun gear to cause rotation of the ring gear 25 in a free wheeling manner. In the case of the embodiment shown in FIG. 2, depression of the pickle switch 51 will produce the same result in energization of the latch relay 36 and energize the electromagnet 28 to allow the ring gear 25 to free wheel about the planetary gears 23. Whenever the pilot desires to return to automatic power compensation and throttle control, he merely actuates the panel switch 41 and the throttle will again be controlled in accordance with the computed requirements of the various sensors to again place the power plant in its best economical and operating condition for the flight attitude assumed by the aircraft.

While many modifications and changes may be made in the constructional details and features of this invention to produce the same or similar results and functions, it is to be understood that we desire to be limited in the spirit of our invention only by the scope of the appended claims.

We claim:

1. An automatic power compensation throttle linkage actuator connected between a throttle and a throttle motor controlled by a control circuit with manual override comprising:

a first throttle shaft coupled to the shaft of said throttle motor;

a mechanical differential having a sun gear, a planetary gear set, and a ring gear with the outer periphery of said ring gear forming a brake drum, said sun gear and said planetary gear set each having shaft connections with said first shaft connected to one of said shaft connections;

a second throttle shaft coupled to a throttle and to the other shaft connection of said mechanical differential, said second throttle shaft having a manual throttle lever connected thereto;

an electromagnetically actuated brake shoe normally engaging said brake drum constituting a brake to hold said brake drum stationary;

a microswitch positioned in actuatable relation to said brake shoe to make contact upon slight rotation of said brake drum by force on said manual throttle lever in either rotative direction;

a latch relay having a primary circuit through its contacts to said electromagnet of said brake and a secondary circuit through the electromagnet of said latch relay and microswitch associated with said brake to disengage said brake once said switch has made contact to uncouple said first and second throttle shafts; and means to release said latch relay to return throttle shaft control to said throttle motor by reengagement of said brake to re-couple said first and second throttle shafts whereby throttle control is selective between automatic throttle motor and manual control in which the manual control disengages the torque drag of the throttle motor control.

2. An automatic power compensation throttle linkage actuator as set forth in claim 1 wherein said first throttle shaft is coupled to said sun gear connection and said second throttle shaft is coupled to said planetary gear set connection.

3. An automatic power compensation throttle linkage actuator as set forth in claim 2 wherein said first throttle shaft includes a friction clutch to permit slip between the motor and differential when the second throttle shaft meets a mechanical limit.

References Cited
UNITED STATES PATENTS

| | | | |
|---|---|---|---|
| 2,519,118 | 8/1950 | Curtis et al. | 74—785 |
| 2,597,357 | 5/1952 | McCormick | 74—785 |
| 2,778,471 | 1/1957 | Kuhn | 74—785 |
| 2,997,895 | 8/1961 | White | 74—626 |
| 3,363,480 | 1/1968 | Murphy | 74—626 |
| 2,420,552 | 5/1947 | Morrill | 74—626 |

WESLEY S. RATLIFF, Jr., Primary Examiner

U.S. Cl. X.R.

74—785